United States Patent
Trinnes et al.

(10) Patent No.: US 10,543,554 B2
(45) Date of Patent: Jan. 28, 2020

(54) WELDING ASSEMBLY FOR HIGH-BANDWIDTH DATA COMMUNICATION

(71) Applicant: LINCOLN GLOBAL, INC., City of Industry, CA (US)

(72) Inventors: Nicholas Trinnes, Solon, OH (US); William T Matthews, Chesterland, OH (US)

(73) Assignee: LINCOLN GLOBAL, INC., City of Industry, CA (US)

( * ) Notice: Subject to any disclaimer, the term of this patent is extended or adjusted under 35 U.S.C. 154(b) by 235 days.

(21) Appl. No.: 14/562,655

(22) Filed: Dec. 5, 2014

(65) Prior Publication Data

US 2016/0158869 A1 Jun. 9, 2016

(51) Int. Cl.
*B23K 9/10* (2006.01)
*B23K 9/12* (2006.01)

(52) U.S. Cl.
CPC .......... *B23K 9/1087* (2013.01); *B23K 9/1043* (2013.01); *B23K 9/124* (2013.01)

(58) Field of Classification Search
CPC ...... B23K 9/1087; B23K 9/124; B23K 9/095; B23K 9/1006; B23K 9/125; B23K 9/10; B23K 9/1043; B23K 9/1068; B23K 9/173; B23K 9/24; B23K 9/32
USPC ............... 219/137, 73, 108, 132, 130, 121; 709/222–224; 398/66
See application file for complete search history.

(56) References Cited

U.S. PATENT DOCUMENTS

| | | | |
|---|---|---|---|
| 5,834,940 A | * | 11/1998 | Brooks ............... G01R 31/025 324/424 |
| 6,104,308 A | | 8/2000 | Wallace et al. |
| 7,180,029 B2 | | 2/2007 | Ott |
| 7,381,922 B2 | | 6/2008 | Ulrich |
| 7,902,484 B2 | | 3/2011 | Ulrich |
| 8,457,125 B2 | | 6/2013 | O'Mahony |
| 8,592,724 B2 | | 11/2013 | Ott |
| 9,012,807 B2 | | 4/2015 | Ott |
| 2006/0138113 A1 | | 6/2006 | Ott et al. |
| 2007/0080154 A1 | * | 4/2007 | Ott ......................... B23K 9/095 219/132 |
| 2010/0008675 A1 | | 1/2010 | De Dobbelaere |
| 2011/0069766 A1 | | 3/2011 | Takahashi |

(Continued)

FOREIGN PATENT DOCUMENTS

| | | |
|---|---|---|
| CN | 1852172 A | 10/2006 |
| CN | 201096746 Y | 8/2008 |

(Continued)

OTHER PUBLICATIONS

European Search Report dated Apr. 12, 2017 for European Patent Application No. 16002289.3.

(Continued)

*Primary Examiner* — Tu B Hoang
*Assistant Examiner* — Vy T Nguyen

(57) ABSTRACT

A welding or cutting system is provided that uses welding cables between a wire feeder and a power supply for high-speed data communications between the wire feeder and the power supply. A system designed as discussed herein eliminates the need for voltage and/or current sense leads for communication arc voltages/currents detected at the welding operation.

12 Claims, 6 Drawing Sheets

(56) References Cited

U.S. PATENT DOCUMENTS

| | | |
|---|---|---|
| 2011/0073569 A1 | 3/2011 | Rappl |
| 2011/0240620 A1 | 10/2011 | Ott |
| 2012/0097644 A1 | 4/2012 | Ott |
| 2013/0043226 A1 | 2/2013 | Stanzel |
| 2013/0236177 A1* | 9/2013 | Fang .................. H04L 12/2801 398/66 |
| 2013/0319988 A1 | 12/2013 | Beistle |
| 2013/0327754 A1* | 12/2013 | Salsich ................ B23K 9/124 219/137.71 |
| 2014/0052832 A1* | 2/2014 | Dina .................... B23K 9/1087 709/221 |
| 2014/0069900 A1 | 3/2014 | Becker |
| 2014/0076872 A1 | 3/2014 | Ott |
| 2015/0196970 A1* | 7/2015 | Denis ................... B23K 9/10 219/130.1 |
| 2016/0045971 A1* | 2/2016 | Holverson ........... B23K 9/1087 219/132 |
| 2016/0136746 A1* | 5/2016 | Denis .................. B23K 9/1087 219/132 |
| 2016/0265349 A1 | 9/2016 | Saulnier |

FOREIGN PATENT DOCUMENTS

| | | |
|---|---|---|
| CN | 101360580 A | 2/2009 |
| CN | 102639275 A | 8/2012 |
| CN | 102664950 A | 9/2012 |
| CN | 102735879 A | 10/2012 |
| CN | 202486643 U | 10/2012 |
| CN | 203426617 U | 2/2014 |
| DE | 19829842 A1 | 1/1999 |
| EP | 1500456 A1 | 1/2005 |

OTHER PUBLICATIONS

Partial European Search Report dated Apr. 18, 2017 for European Patent Application No. 16002291.9.
European Search Report E1160264EP dated Apr. 12, 2017 for European Patent Application No. 16002288.5.
European Search Report E1160266EP dated Apr. 12, 2017 for European Patent Application No. 16002290.1.
CN204392242U English Machine Translation.

* cited by examiner

WELDING ASSEMBLY FOR HIGH-BANDWIDTH DATA COMMUNICATION

FIELD OF THE INVENTION

Devices, systems, and methods consistent with the invention relate to data communication in welding systems, and more specifically related to high-bandwidth data communication over welding cables.

BACKGROUND OF INVENTION

As welding technology and applications have advanced so have the demands on power supply sources. These increased demands may require power supplies to respond to rapid changes in conditions of a welding operation almost instantaneously. These changes, for example, can include adjusting the welding current supplied to a wire feeder. Thus, there is an increased need for a high-speed communication link between a welding power supply source and a wire feeder. Such a high-speed communication link can transmit large amounts of data in the form of digital signals. For compactness in size, and instead of adding a separate cable, it would be desirable to have the high-speed communication link set up directly over welding cables that connect a power supply to a wire feeder. The present disclosure discusses such an approach.

BRIEF SUMMARY OF THE INVENTION

Embodiments of the present invention include employing welding cables that facilitate high-speed bi-directional data communications between a wire feeder and a power supply. The circuitry included inside the wire feeder and the power supply allow for such communications to take place concurrently with transfer of welding power signals. Network modules included within the wire feeder and the power supply in conjunction with the high-speed, high-bandwidth communication capabilities allow a user to use either (or both) of the wire feeder or power supply as a unit for connecting to a network (e.g., the world wide web). Further, a system designed as discussed herein eliminates the need for voltage and/or current sense leads for communication arc voltages/currents detected at the welding operation.

BRIEF DESCRIPTION OF THE DRAWINGS

The above and/or other aspects of the invention will be more apparent by describing in detail exemplary embodiments of the invention with reference to the accompanying drawings, in which.

DETAILED DESCRIPTION OF EXEMPLARY EMBODIMENTS

Figure 1:
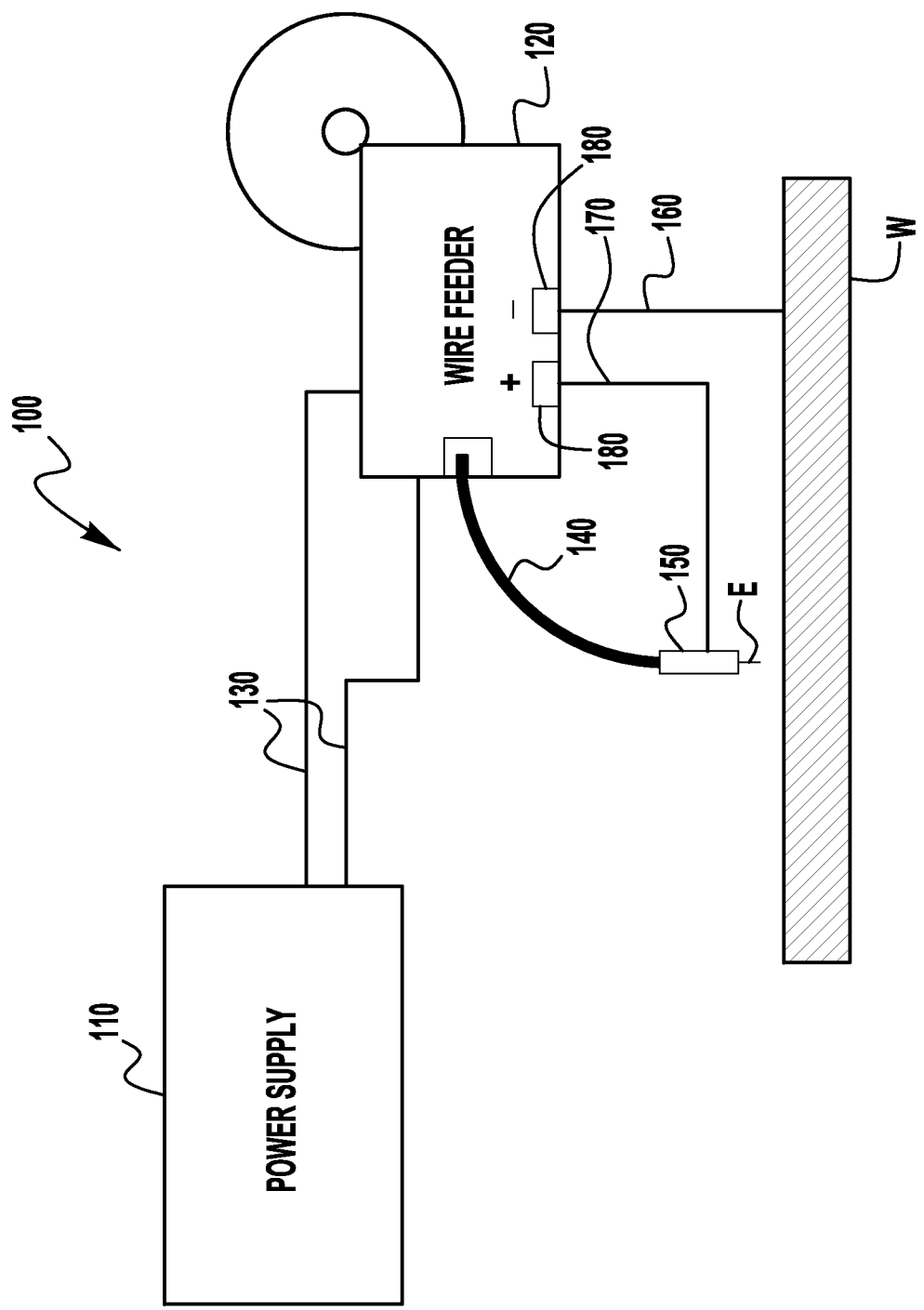
FIG. 1 illustrates a diagrammatical representation of an overall welding system in accordance with an exemplary embodiment of the present invention.

Exemplary embodiments of the invention will now be described below by reference to the attached Figures. The described exemplary embodiments are intended to assist the understanding of the invention, and are not intended to limit the scope of the invention in any way. Like reference numerals refer to like elements throughout.

Turning now to the figures of the present application, FIG. 1 depicts an exemplary MIG welding system 100 in accordance with an embodiment of the present invention. As is typical, the system 100 contains a power supply 110 coupled to a wire feeder 120 via welding cables 130. The power supply 110 outputs a welding current, which is directed to the wire feeder 120 so that the wire feeder can pass the current on to the electrode E for welding the workpiece W. A wire feeding cable 140 delivers the electrode E to a contact tip 150, which imparts the welding current into the electrode E via a welding cable 170. Although the cable 170 is shown separate from the cable 140, it is known that the cable 170 can be internal to the housing of the cable 140. A ground cable 160 is also coupled to the workpiece W. Each of the power cables 170 and 160 are connected to the wire feeder 120 via power studs 180. The welding signal which is received from the power supply 110 is provided to the cables 160/170 via the output studs 180. That is, the welding current and voltage detected at the studs 180 is representative of the voltage and current of the actual welding arc present between the electrode E and the workpiece W. This is because the wire feeder 120 is typically located close to the welding operation and, as such, the current and voltage detected at the studs 180 is representative of the voltage and current of the arc. Therefore, in exemplary embodiments of the present invention, which will be discussed in more detail below, exemplary embodiments of the system 100 does not use any separate arc power sense leads coupled to the workpiece W and either the wire feeder 120 or the power supply 110. Further, embodiments of the present invention do not use any separate communication lines or conduits between the wire feeder 120 and the power supply 110.

As described later, the welding cables 130 are designed to carry high-speed data communications (e.g., control commands) in addition to the welding power signal, between the power supply 110 and the wire feeder 120. Embodiments of the present invention support uni-directional as well as bi-directional high-speed communication between the wire feeder 120 and the power supply 110. Accordingly, the power supply and the wire feeder both transmit/receive signals and/or data with respect to each other over the cables 130.

As is generally understood, the power supply 110 receives an AC signal as its input (not shown in FIG. 1). The AC signal can be received as a 3-phase input, or a single phase AC input signal. The AC signal can vary in voltage and frequency depending on the source of power and/or the country of operation. For example, the AC input can be from a utility grid—which can range from 100 to 660 volts at 50 or 60 Hz—or can be from a portable generator, which can also have a varying voltage and frequency. Thus, the system 100 is capable of operating properly and providing a welding or cutting signal regardless of the input AC voltage magnitude, phase type and frequency. The power supply 110 is designed to run in various modes including constant voltage (CV) and constant current (CC) modes, as suitable in various applications. Thus, the power supply 110 can include additional electrical components to condition the raw AC signal received and output the desired welding signal.

In most exemplary embodiments, the power from the power supply 110 is suitable for welding and is transmitted to the wire feeder 120 via the welding cables 130—which are large diameter electrical conduits. Thus, in exemplary embodiments of the present invention, the welding signal (i.e., the current signal sent to the contact tip 150 that is actually used for welding) is originally generated, controlled and modified within the power supply 110, and then communicated via welding cables 130 to the wire feeder 120. In addition to feeding the electrode E, the wire feeder 120 passes on the received welding signal to the arc using the cables 160 and 170.

In traditional welding systems, sense leads are often used to sense a voltage and/or a current of the welding arc to allow for proper control of the welding operation. The sense leads are electrically coupled to the workpiece and the contact tip to provide feedback regarding the voltage and current of the arc. This feedback is used by the power supply 100 to control the creation and output of the welding signal. For example, the sense leads would be used to detect a short circuit event and the power supply 110 would output a signal which allows for the short to be cleared. However, because sense leads are smaller cables than the main welding power cables 130, the sense leads are less durable than the welding cables and, as such, are prone to nicks and snags typically associated with industrial locations.

For example, it is noted that in some applications, the wire feeder 120 is positioned a significant distance from the power supply 110, thus requiring the cables 130, and any other data carrying or sense lead cables, to be quite long. This often occurs when the welding operation is not conducive to having the power supply 110 close to the welding operation, but the wire feeder 120 is positioned close by to ensure proper wire feeding. In such applications, sense leads for sensing a voltage and/or a current of the welding operation can also be very long. It is in these applications that challenges can develop with a welding system 100. Specifically, long cables and sense leads are expensive and can break from time to time. Further, these long cables can greatly increase the overall system inductance during a welding operation. This increase in inductance can be a detriment to the welding operation because it can adversely affect the overall responsiveness of the welding power supply 110. This is particularly problematic in pulse welding operations. Therefore, it is desirable to reduce the overall system inductance as much as possible. Thus, in contrast to such welding systems, embodiments of the present disclosure do not employ sense leads to sense a voltage and/or a current of the welding operation, as explained below. Further, separate control cables are typically used to connect the power supply and the wire feeder. These are also prone to damage and other limitations, because of their length.

With embodiments of the present invention, the power supply 110 and the wire feeder 120 can be placed apart from each other by very large distances, whereas with traditional welding systems there exists a maximum effective distance between the welding power supply and the wire feeder. For example, traditional systems should not have more than 100 feet in between the power supply and the wire feeder. However, with embodiments of the present invention, that distance can be greatly exceeded without affecting the performance of the welding operation in any way. In fact, the components 110 and 120 can be separated from each other by a distance in the range of 100 to 500 feet. In other exemplary embodiments the distance is in the range of 250 to 500 feet.

Figure 2:
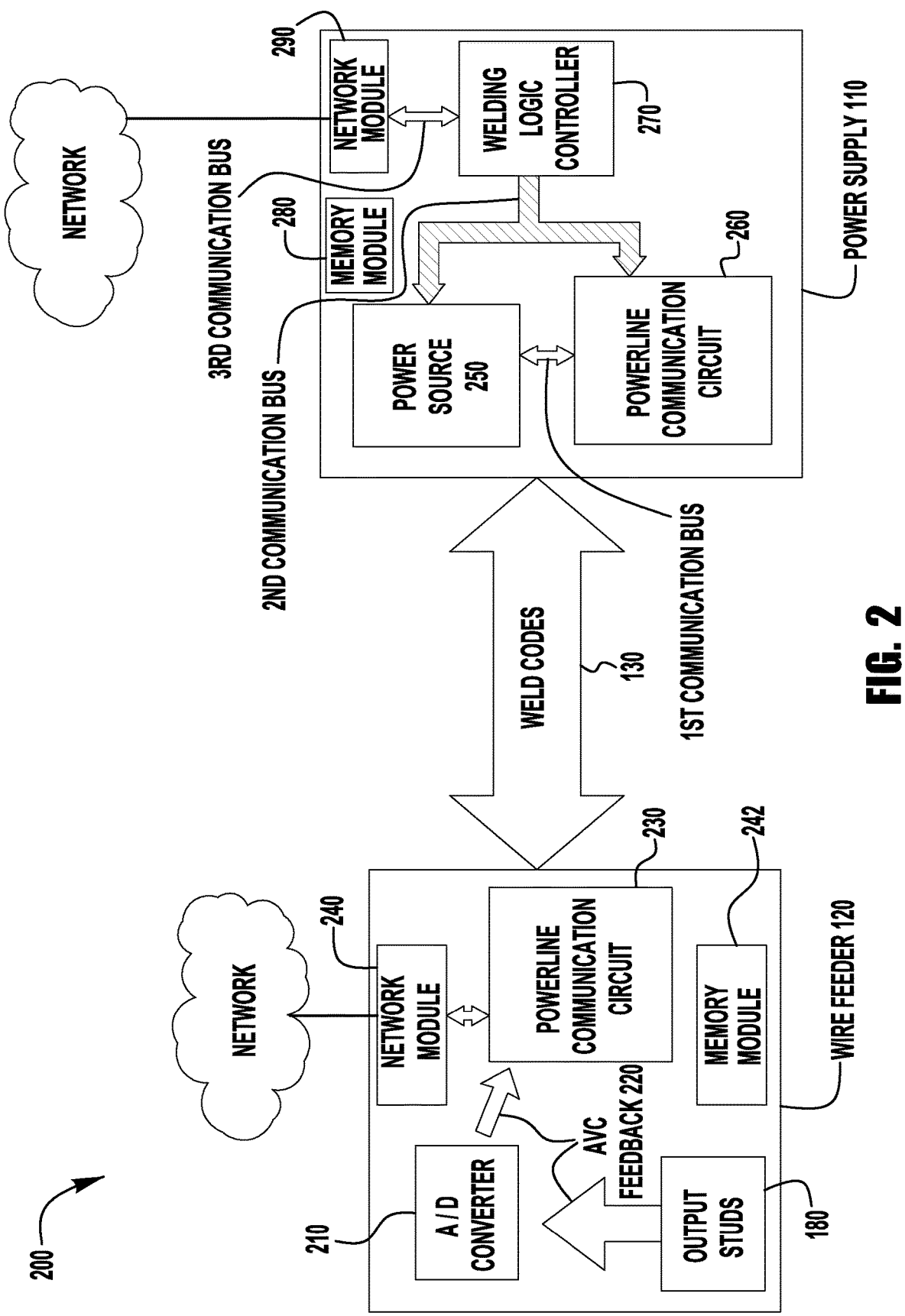
FIG. 2 illustrates a diagrammatical representation of the internal architecture of an exemplary welding system in accordance with an exemplary embodiment of the present invention.

FIG. 2 shows an exemplary internal architecture 200 of the welding system 100 shown in FIG. 1. It is shown that a wire feeder 120 is connected to a power supply 110 via one or more welding cables 130, which carry the welding signal from the power supply 110 to the wire feeder 120. It will be understood that the wire feeder electronics and control included in the wire feeder 120 can be made consistent with known wire feeder mechanisms, and the wire feeder can also receive power from the welding cables 130 to power its components and operations. In exemplary embodiments, the wire feeder 120 includes an analog-to-digital converter 210, a powerline communication circuit 230, a memory module 242, and a network module 240. Details of operation of an embodiment of the powerline communication circuit 230 will be explained in greater detail in connection with FIG. 6. As explained above, the output studs 180 are used by the wire feeder 120 to monitor the arc voltage and current and thus an arc voltage/current detection circuit is coupled to the studs such that the output studs 180 provide an arc feedback signal 220 (i.e., a current and/or a voltage of the arc) of the welding operation. The arc voltage/current detection circuit can be configured to be consistent with known circuits which are used with sense lead systems. However, rather than using the sense leads, embodiments of the present system utilize the arc voltage/current detection circuit simply to obtain the arc voltage/current data via the studs 180 of the wire feeder 120. This arc voltage/current data is transmitted as a feedback signal 220 to the A/D converter 210. Further, in embodiments of the present system, various components within the wire feeder 120 can be coupled with each other by high-speed communication buses (not shown in FIG. 2).

Analog-to-digital converter 210 converts an analog signal (e.g., arc feedback signal 220) to a digital signal. Typically, analog information in an analog signal is transmitted by modulating a continuously transmitted signal, e.g., by varying a signal's amplitude strength, or by varying a signal's frequency. Memory module 242 can store instructions, code, and/or data for providing various functionalities of the wire feeder 120. The network module 240 can be connected to a network such as the world wide web or an intranet for electronic communications, e.g., via an Ethernet port, or via any known wireless communication techniques, such as Bluetooth, etc. Additionally, the network module 240 can be connected to other peripheral devices via a USB port on the network module. Also, in embodiments of the present invention control commands can be transmitted/received to/from other devices included as part of a communications network.

Embodiments of the present invention provide improved sensing and thus control over the welding process, as well as providing significant control and communication versatility not known with existing welding systems. This is in part because such sensing and control is via high-speed digital data communications over the welding cables 130 connecting the power supply 110 to the wire feeder 120. For instance, the wire feeder 120 can communicate the arc feedback signal (alternatively referred to herein as a welding arc feedback signal) representative of an arc voltage and current detected at the welding process) to the power supply 110 within a few microseconds or even nanoseconds— without the use of any sense leads or any separate feedback connections between the power supply 110 and the arc. Accordingly, the power supply 110 can make adjustments (within a few microseconds or even nanoseconds) to the welding power, in response to the receiving the arc feedback signal. In some exemplary embodiments, the high-speed digital data communications is defined at least in part on a powerline communication specification, e.g., based on the G.hn family of standards. The G.hn family of standards generally utilizes Orthogonal frequency division multiplexing (OFDM) techniques for data modulation. For example, various operational parameters and control commands can be encoded using OFDM for transmission over the welding cables. To be clear, in embodiments of the present invention, the high-speed data communications are transmitted over the same electrical conduits as the welding power signal in the cables 130 and can be transmitted at the same time as the welding power signal. Additionally, in exemplary embodiments, the high-speed data communications can be sent over only a single one of the cables 130, or both cables 130 in other embodiments. Further aspects of these exemplary embodiments will be discussed below.

Power supply 110 includes a power source 250, a powerline communication circuit 260, a welding logic controller 270, a network module 290, and a memory module 280. Various components within the power supply 110 can be coupled with each other by high-speed communication buses. For example, the power source 250 and the powerline communication circuit 260 can be connected by a first communication bus. Also, a second communication bus can be coupled between the welding logic controller 270, and both the power source 250 and the powerline communication circuit 260. A third communication bus can connect the network module 290 and the welding logic controller 270. Memory module 280 can store instructions, code, and/or data for providing various functionalities of the power supply 110. The network module 240 can be connected to a network such as the world wide web or an intranet for electronic communications, e.g., via an Ethernet port, or via any known wireless communication techniques, such as Bluetooth, etc. Additionally, the network module 240 can be connected to other peripheral devices via a USB port on the network module. Also, in embodiments of the present invention control commands can be transmitted/received to/from other devices in a communications network. Welding logic controller 270 can provide control commands to the power supply 110. The control commands can be encoded using a powerline communication specification, e.g., based on the G.hn family of standards. Exemplary details of operation of the welding logic controller will be discussed in connection with FIG. 7. In some instances, the power supply 110 can communicate a power signal that is insufficient for welding, but could be used to power the electronics in the wire feeder 120. To automatically compensate for losses across welding cables that run over long distances, the power supply and/or the wire feeder can include additional circuitry. For example, the welding power signal or the arc feedback signal can be modified to compensate for losses experienced across welding cables.

It will be understood and appreciated that the specific modules and components shown in FIG. 2 are for illustrative purposes only, and embodiments of the present system are not limited to the specific architecture shown. Additional components (e.g., transceivers, controllers, etc.) can be included in either (or both of) the wire feeder and the power supply, as will occur to one skilled in the art. For example, in some embodiments a powerline communication circuit can include multiple input, multiple antennas. It will be further understood that embodiments of the present disclosure allow the use of various other types of powerline communication protocols and specifications, and not necessarily limited to the G.hn family. Furthermore, different one communication protocols and specifications can be used for communicating different types of control commands, or even different types of components.

Figure 3:
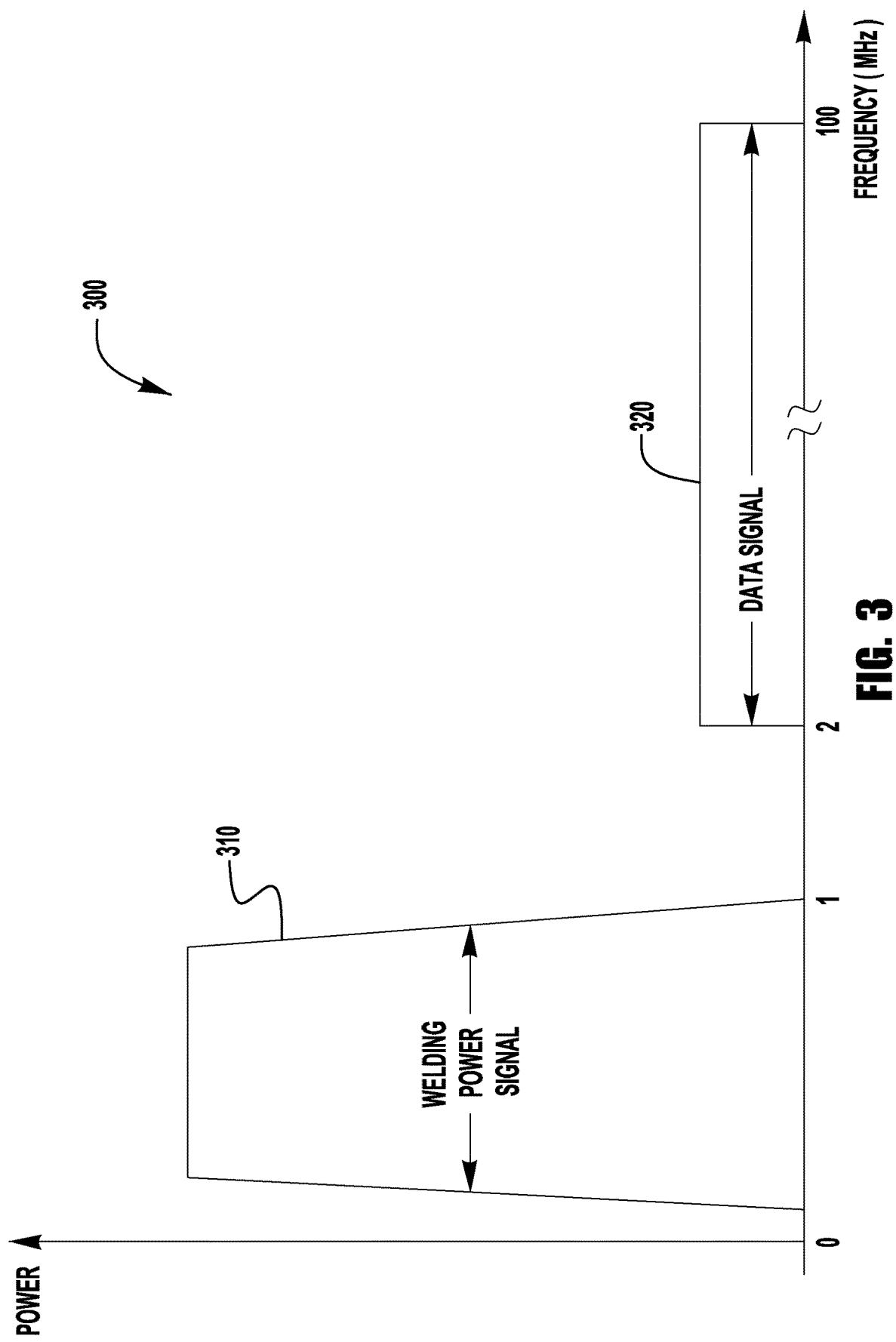
FIG. 3 illustrates a diagrammatical representation of an exemplary power profile of an exemplary welding system, in accordance with an exemplary embodiment of the present invention.

FIG. 3 illustrates a diagrammatical representation of an exemplary power profile 300 of an exemplary welding system as shown in FIGS. 1 and 2. Specifically, FIG. 3 indicates a power vs frequency spectrum, wherein a welding power signal 310 is overlaid next to a data signal 320 in frequency. In exemplary embodiments, the welding power signal 310 can occupy lower frequencies, whereas the data signal occupies higher frequencies. It is also shown in FIG. 3 that such a low frequency welding power signal 310 has a lower bandwidth. That is, in exemplary embodiments the bandwidth of the power signal 310 is no more than 1 MHz. However, the data signal 320 has a much higher bandwidth than the power signal 310. This allows systems of the present invention to transmit very large amounts of data over the power lines 130 without interfering with the welding operation in any way and greatly approves the versatility of welding systems 100. In exemplary embodiments of the present invention, the frequency of the data signal 320 ranges between 2 and 100 MHz. In further exemplary embodiments the frequency ranges between 10 and 100 MHz. In some embodiments, the frequency ranges between 40 and 100 MHz. Further, the low frequency welding power signal 310 has an upper frequency limit and the high-bandwidth data signal 320 has a lower frequency limit. For example, in exemplary embodiments the welding power signal 310 has an upper frequency limit of 1 Mhz, and the high-bandwidth data signal has a lower frequency limit of 2 MHz. It is contemplated that in some embodiments, the upper frequency limit of the welding power signal 310 could be higher than 1 MHz. However, in those embodiments, there is no overlap between the welding power signal 310 and the data signal 320. Thus, a gap will still be maintained between the welding power signal 310 and the data signal 320, as explained herein. In further exemplary embodiments, the high-bandwidth data signal has a lower frequency limit in the range of 2 to 20 MHz. Not only are the upper frequency limit and the lower frequency limit distinct from each other, but additionally, in exemplary embodiments a minimum frequency gap exists between the upper frequency limit and the lower frequency limit, in embodiments of the present invention. For example, in exemplary embodiments the minimum frequency gap is 1 Mhz. In other exemplary embodiments, the minimum frequency gap is greater than 1 MHz so as to avoid interference between the signals. In some other exemplary embodiments, the minimum frequency gap is less than 1 MHz, as long as the upper frequency limit of the welding power signal 310 does not overlap with the lower frequency limit of the data signal 320. Thus, in some embodiments, the powerline communication circuit in either (or both) the wire feeder and the power supply extracts the high-bandwidth OFDM data signal by passing the incoming resultant signal (e.g., welding power supply signal 310 and high-bandwidth OFDM data signal 320) through a high order, high pass filter. In further exemplary embodiments the minimum frequency gap is in the range of 1 to 20 MHz.

Figure 4:
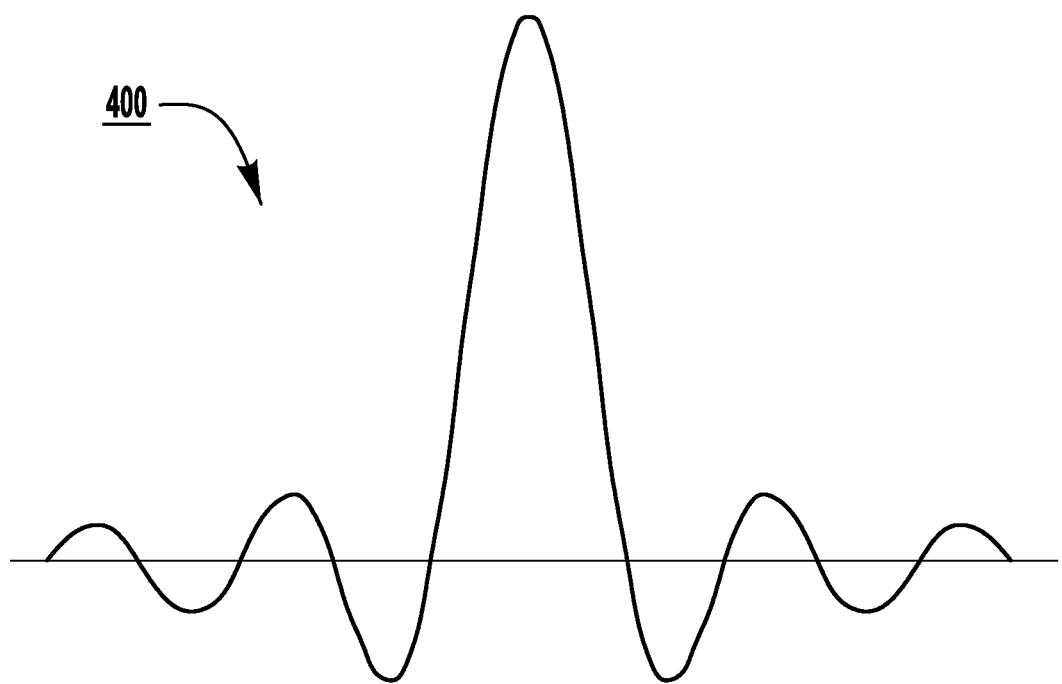
FIG. 4 illustrates a diagrammatical representation of an exemplary frequency spectrum corresponding to an OFDM signal showing a single carrier frequency, in accordance with an embodiment of the present invention.

FIG. 4 illustrates a diagrammatical representation of a frequency spectrum corresponding to an OFDM signal showing a single carrier frequency. OFDM techniques allow for high-speed data communication by encoding data on multiple, simultaneous carrier frequencies that are distinct from each other. In one embodiment, the high-bandwidth OFDM data signal used for data communications between the wire feeder and the power supply comprises 4096 distinct, simultaneous carrier frequencies.

Figure 5:
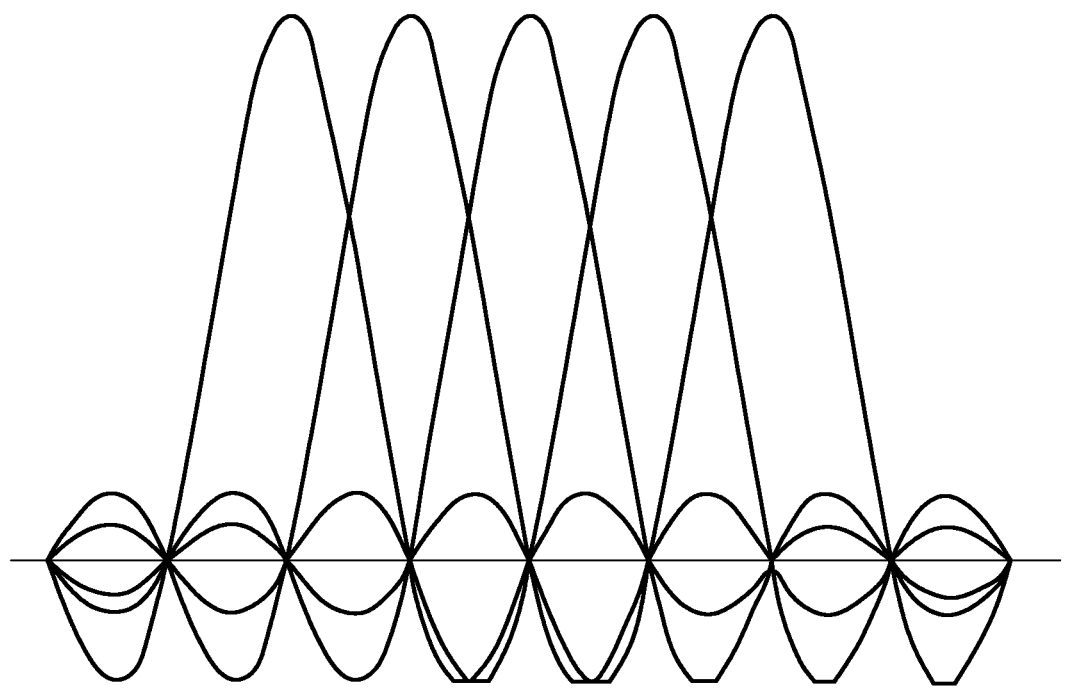
FIG. 5 illustrates a diagrammatical representation of an exemplary frequency spectrum corresponding to an OFDM signal showing a plurality of carrier frequencies, in accordance with an embodiment of the present invention.

For illustrative purposes, a frequency spectrum corresponding to an OFDM signal showing five exemplary carrier frequencies is shown in FIG. 5. In OFDM, the carrier frequencies are chosen in a manner such that the carriers are orthogonal to each other, meaning that cross-talk between the data channels (occupied by the carriers) is eliminated and inter-carrier guard bands are not required. This greatly simplifies the design of both the transmitter and the receiver; unlike conventional frequency division multiplexing methodologies. For example, using OFDM, a separate filter for each data channel is not required. Also, because OFDM is a high-bandwidth data modulation technique, an OFDM-modulated high-bandwidth data signal generally has a nearly "white" spectrum, giving it benign electromagnetic interference properties with respect to other co-channel users.

Figure 6:
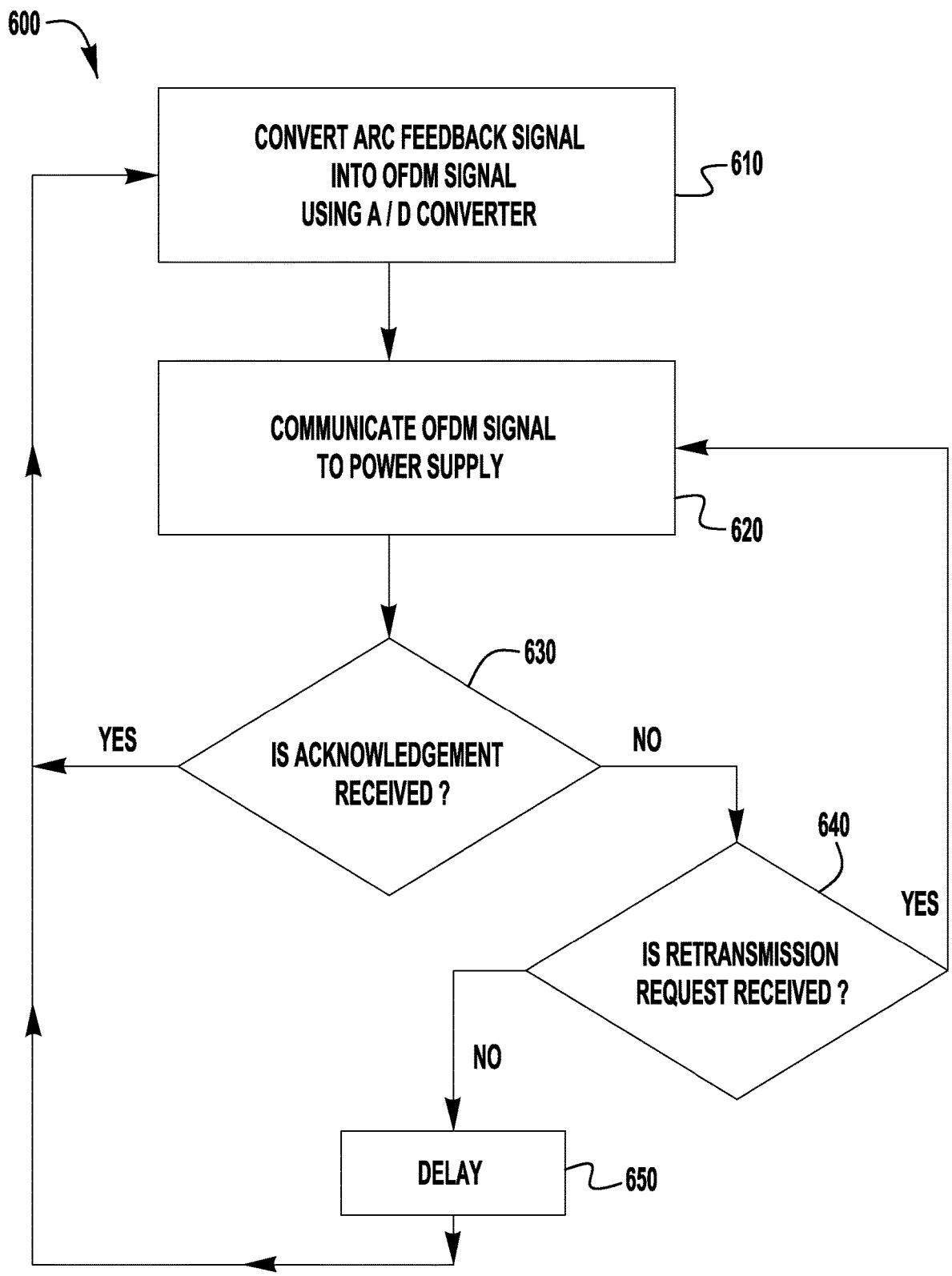
FIG. 6 illustrates a logical flow of exemplary method steps performed by a wire feeder as part of a welding operation, in accordance with an embodiment of the present invention.

FIG. 6 illustrates a logical flow of exemplary method steps 600 performed by a wire feeder, in accordance with an embodiment of the present invention. Starting at step 610, a wire feeder (e.g., wire feeder 120 in FIG. 1) converts an arc feedback signal (e.g., received via output studs shown in FIG. 2) into an OFDM signal using an analog-to-digital converter. Then the wire feeder communicates the (OFDM-modulated) arc feedback signal to the power supply (e.g., power supply 110 in FIG. 1), at step 620. It will be understood that the term "arc feedback signal" as used herein can be construed to mean a numerical value corresponding to the arc feedback signal. At step 630, the wire feeder determines whether or not an acknowledgement has been received from the power supply. In order to add to the robustness of the communications link, electronic communications over a communications link set up between components that exchange data is generally associated with an acknowledgement corresponding to receipt of the transmitted data. For example, in connection with the system 200 in FIG. 2, a power supply 110 can acknowledge receipt of the arc feedback signal 220 to the wire feeder 110. However, if an acknowledgment of receipt of the arc feedback signal is not received, the wire feeder proceeds to step 640 in which it determines whether or not a request for retransmission is received.

In some scenarios, a power supply can, instead of acknowledging receipt of the arc feedback signal, request retransmission of the arc feedback signal. Such a scenario, for example, can arise if a previously transmitted arc feedback signal gets corrupted during transmission, or otherwise, is not received by the power supply. Thus, if the wire feeder determines (at step 640) that it has received a request for retransmission, then the arc feedback signal is retransmitted. Accordingly, the flow of instructions moves to step 620 as shown in FIG. 6, and resumes thereafter.

However, if the wire feeder determines that it has not received a request for retransmission, then the flow of instructions moves to step 650, wherein the wire feeder initiates one more time delay cycles. Typically, after the delay is over, the wire feeder reverts back to step 610 and resumes its operation as discussed above. As will be understood and appreciated, the steps of the process 600 shown in FIG. 6 may operate concurrently and continuously, are generally asynchronous and independent, computer-implemented, tied to particular machines, and not necessarily performed in the order shown. Further, in embodiments that employ multi-carrier modulation techniques such as OFDM, re-transmissions of control commands can occur at the original frequency, or such re-transmissions could be at different carrier frequencies. In that regard, the control commands can be cycled through multiple frequencies until it is received and verified. Moreover, in some embodiments, a fixed number of retransmissions are attempted before an error message is sent to the user.

Figure 7:
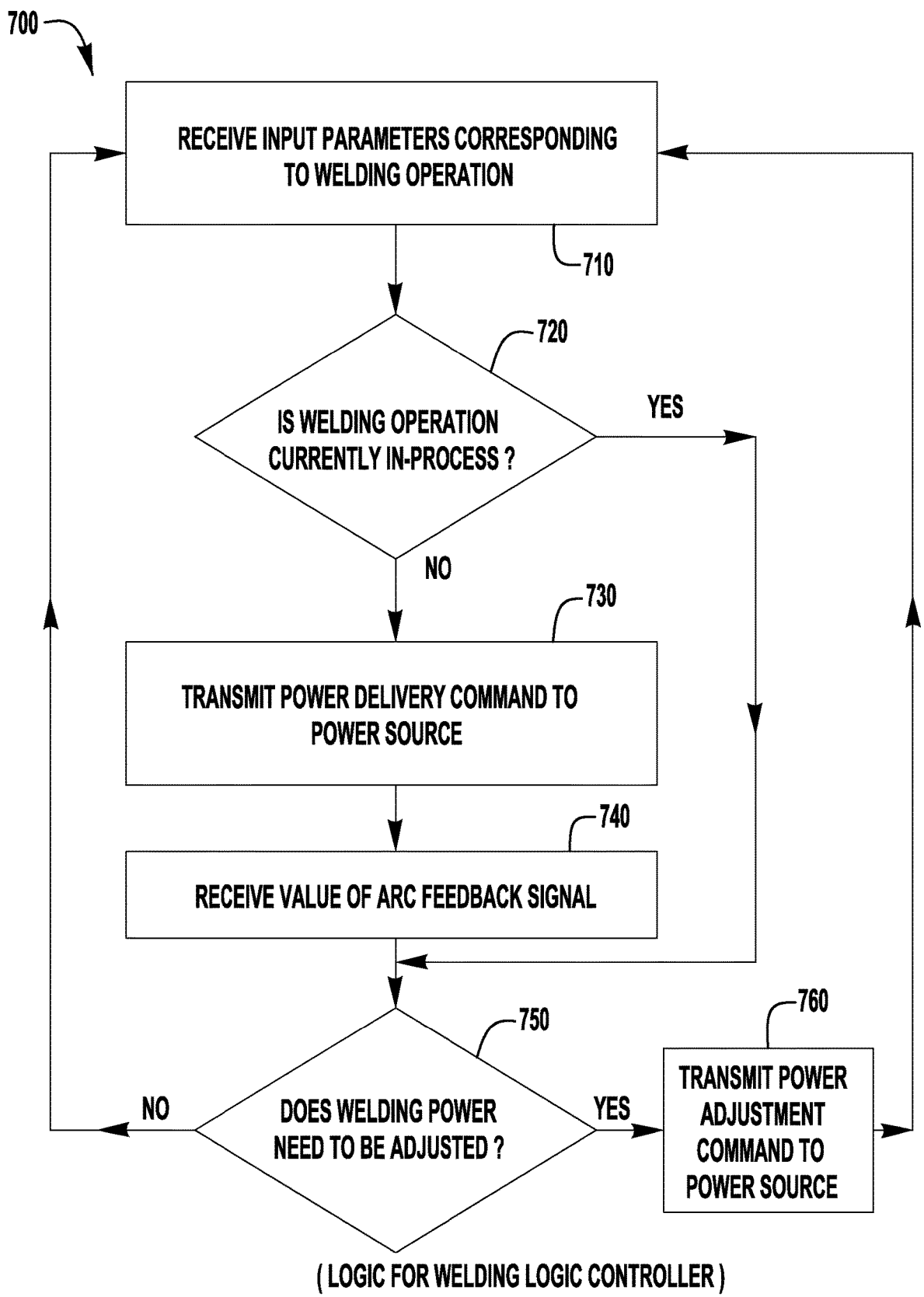
FIG. 7 illustrates a logical flow of exemplary method steps performed by a welding logic controller as part of a welding operation, in accordance with an embodiment of the present invention.

FIG. 7 illustrates a logical flow of exemplary method steps 700 performed by a welding logic controller, in accordance with an embodiment of the present invention. Starting at step 710, the power supply receives input parameters (e.g., wire feed speed, arc voltage, etc.) corresponding to a welding operation. Such input parameters can be supplied by a human user, for example, via a digital interface. Alternately, a human user can supply such parameters by rotating some kind of a control knob, as will occur to one skilled in the art. It is noted that in some systems the user data can be input via the wire feeder and transmitted to the power supply via the communications methodologies described herein, and because such systems are known they are not described in detail herein. If the parameters are analog parameters, then such analog parameters are first converted into digital values, e.g., by using an analog-to-digital converter. At next step 720, the welding logic controller determines whether a welding operation is currently in-progress. If the welding logic controller determines that a welding operation is currently in-progress, then it reverts to step 750, and resumes thereafter, as will be explained below. However, if the welding logic controller determines that a welding operation is not currently in-progress, then it transmits (at step 730) a power delivery command to the power source (e.g., power source 250 shown in FIG. 2). Thus, after receiving a power delivery command, a wire feeder provides welding power to a welding operation.

At step 740, the welding logic controller receives a value of arc feedback signal (e.g., in the form of a voltage and/or a current) at the welding operation. According to embodiments of the present invention, the arc feedback signal is transmitted as a high-bandwidth OFDM data signal by the wire feeder to the power supply. Based on the received arc feedback signal, the power supply adjusts the welding power supply signal.

When a welding operation is currently in-process (regardless of whether an arc feedback voltage is received or not), or alternately, after the value of the arc feedback signal is received, the logical flow of instructions moves to step 750. At step 750, the welding logic controller determines if the welding power needs to be adjusted. (For example, a welding power signal can be subjected to a change in current and/or voltage.) If the welding logic controller determines (at step 750) that the welding power does not need to be adjusted, then it proceeds to step 710 and continues thereafter.

However, if the welding logic controller determines (at step 750) that the welding power needs to be adjusted, then it transmits a power adjustment command to the power source, at step 760. Subsequently, the logical flow of instructions moves to step 710 and continues thereafter. As will be understood and appreciated, the steps of the process 700 shown in FIG. 7 may operate concurrently and continuously, are generally asynchronous and independent, computer-implemented, tied to particular machines, and not necessarily performed in the order shown. In addition to the specific commands discussed in FIG. 7, in alternate embodiments other information can be communicated. For example, the information to be communicated to the power supply may include welding power supply output command information (amperage/voltage control), welding circuit on/off information, and power source state control (constant voltage/constant current).

Because of the attributes and configurations discussed above, exemplary systems of the present invention can provide significant advantages over known welding systems. First, as explained previously, exemplary embodiments of the present system allow for the elimination of sense leads to detect the arc voltage/current. Instead, the arc voltage/current data is detected internal to the wire feeder and then transmitted to the power supply over the welding power cables using the high-speed data transmission methods described herein. This increases the robustness and utility of the welding system, and enhances the communication capabilities between the wire feeder and the power supply. That is, using embodiments of the present invention, the wire feeder and power supply can communicate with each other without separate communication cables and do so with a high data transmission rate. Further, this communication and data transmission occurs without adversely affecting the welding signal or welding operation, even though the high-speed data is being transmitted over the same welding cables as the welding signal.

Additionally, embodiments of the present invention greatly increase the usability of welding system components in a welding environment. As described with respect to FIG. 2, both the wire feeder and power supply can be connected to a network (e.g., the world wide web) via a network module. Thus, each of the welding system components can be used to expand a computer network within a welding environment, or alternatively, introduce computer communications inside a welding environment. Because of the ability of high-speed, high-bandwidth communication capabilities over welding cables, a user can now use either (or both) of the wire feeder or power supply as a unit for connecting to a network in order to optimize work. For example, in a warehouse environment, it may be desirable for a user to be able to connect to a network or to the internet to monitor welding performance, download welding data or programs, or conduct other work from any location within the warehouse. With known welding systems, in such an environment, a separate computer network equipped with individual access points will need to exist in the warehouse, regardless of whether it is a wireless or wired network. However, if the warehouse were equipped with welding systems as described herein, the welding systems themselves can act as the source of network connections, and thus no separate computer network will be needed. That is, because of the high-speed nature of the data transmission systems described herein, a user can simply plug into (or connect) to a wire feeder or power supply located nearby and connect to either a public or private network as desired. Also, because of the high-speed communication over the welding cables as described herein, the user would have a data connection as if they were connected to a traditional computer network. This is not achievable with current welding systems. Similarly, the same advantages can be achieved in less network-friendly environments. For example, in an outdoor environment, such as those on pipelines, shipyards, etc. a user will be able to connect to a computer network via the system described herein without the need for a separate computer network. That is, an exemplary power supply 110 can be connected to a network at a first location while the wire feeder 120 is positioned remotely at a second location, away from any network connection and close to the welding operation. The user, for example, can simply connect to the wire feeder 120 as a network connection and all data will be transmitted over the welding power cables 130, even during welding. This prevents the need for relying on slower cellular communications-if available-or the construction of a separate computer network. Thus, embodiments of the present invention greatly increase the versatility and robustness of welding systems, without compromising or adversely affecting the welding operation.

A computer program (e.g., a computer program system) can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps can be performed by one or more programmable processors executing a computer program to perform functions of the invention by operating on input data and generating output. Method steps can also be performed by, and apparatus can be implemented as, special purpose logic circuitry, e.g., an FPGA (field programmable gate array) or an ASIC (application specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, (e.g., magnetic, magneto-optical disks, or optical disks). Data transmission and instructions can also occur over a communications network. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the above described techniques can be implemented on a CNC or computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The above described techniques can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an example implementation, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

Comprise, include, and/or plural forms of each are open ended and include the listed parts and can include additional parts that are not listed. And/or is open ended and includes one or more of the listed parts and combinations of the listed parts.

As stated above, although the majority of the discussion in the present application has been discussed within the context of welding power supplies and wire feeders, these discussions were exemplary. In other words, while the invention has been particularly shown and described with reference to exemplary embodiments thereof, the invention is not limited to these embodiments. It will be understood by those of ordinary skill in the art that various changes in form and details may be made therein without departing from the spirit and scope of the invention as defined by the following claims.

What is claimed is:

1. A welding power supply, comprising:
  a welding power source which generates a welding power signal for a welding process and configured to provide said welding power signal via two welding cables;
  a powerline communication circuit configured to couple to at least one welding cable of said two welding cables, where said powerline communication circuit is configured to receive a high-bandwidth OFDM (orthogonal frequency division multiplexing) data signal via said at least one welding cable, said powerline communication circuit configured to communicate with said welding power source via a first high-speed communication bus, wherein said high-bandwidth OFDM data signal lies in a frequency range from 2 MHz to 100 MHz and corresponds to a welding arc feedback signal representative of an arc voltage detected at the welding process;
  a welding logic controller configured to communicate with said powerline communication circuit and said welding power source via a second high-speed communication bus, said welding logic controller further configured to receive said welding arc feedback signal and determine whether said welding power signal needs to be adjusted, and detect a short circuit event, based on said welding arc feedback signal, and
  a network module configured to connect the welding power supply to a communications network;
  wherein said welding power signal is automatically adjusted to compensate for losses across said at least one welding cable, and to clear the short circuit event,
  wherein said powerline communication circuit is configured to transmit to a remote wire feeding device high-bandwidth internet data from the network module, and an acknowledgment of successful receipt of said welding arc feedback signal, over said at least one welding cable using OFDM,
  wherein the welding power signal has a higher power level and a smaller bandwidth than the high-bandwidth internet data, and the high-bandwidth internet data lies in a frequency range from 2 MHz to 100 MHz, and the welding power signal lies in a frequency range of greater than 0 Hz to 1 MHz, and
  wherein the remote wire feeding device comprises another network module configured to provide said high-bandwidth internet data from the welding power supply to a user device, wherein the remote wire feeding device provides an internet access point for said user device.

2. The welding power supply of claim 1, wherein said welding power signal has an upper frequency limit and said high-bandwidth OFDM data signal has a lower frequency limit, and a frequency gap of at least 1 MHz exists between said upper frequency limit and said lower frequency limit.

3. The welding power supply of claim 1, wherein said high-bandwidth OFDM data signal comprises 4096 distinct, simultaneous carrier frequencies.

4. The welding power supply of claim 1, wherein said powerline communication circuit comprises multiple input, multiple output antennas.

5. The welding power supply of claim 1, wherein said high-bandwidth OFDM data signal is defined at least in part on a powerline communication specification.

6. The welding power supply of claim 5, wherein said powerline communication specification is based on the G.hn family of standards.

7. The welding power supply of claim 1, wherein said powerline communication circuit is configured to transmit to the remote wire feeding device the high-bandwidth internet data and a request for retransmission of said welding arc feedback signal upon failure to receive said welding arc feedback signal.

8. The welding power supply of claim 1, wherein said powerline communication circuit includes a memory module.

9. The welding power supply of claim 8, wherein said network module of the welding power supply includes an Ethernet port.

10. The welding power supply of claim 8, wherein said network module of the welding power supply includes an USB port.

11. The welding power supply of claim 1, further comprising a housing unit that includes said welding power source, said powerline communication circuit, and said welding logic controller.

12. The welding power supply of claim 1, wherein a length of said at least one welding cable is in a range that is 100 to 500 feet.

* * * * *